Feb. 6, 1968 W. E. SCHLAG 3,367,819
METHOD OF MAKING INFLATABLE DUNNAGE BAG
Original Filed Dec. 22, 1961 2 Sheets-Sheet 1

INVENTOR.
WILLIAM E. SCHLAG
BY
John D. Haney
ATTY.

Feb. 6, 1968    W. E. SCHLAG    3,367,819
METHOD OF MAKING INFLATABLE DUNNAGE BAG
Original Filed Dec. 22, 1961    2 Sheets-Sheet 2
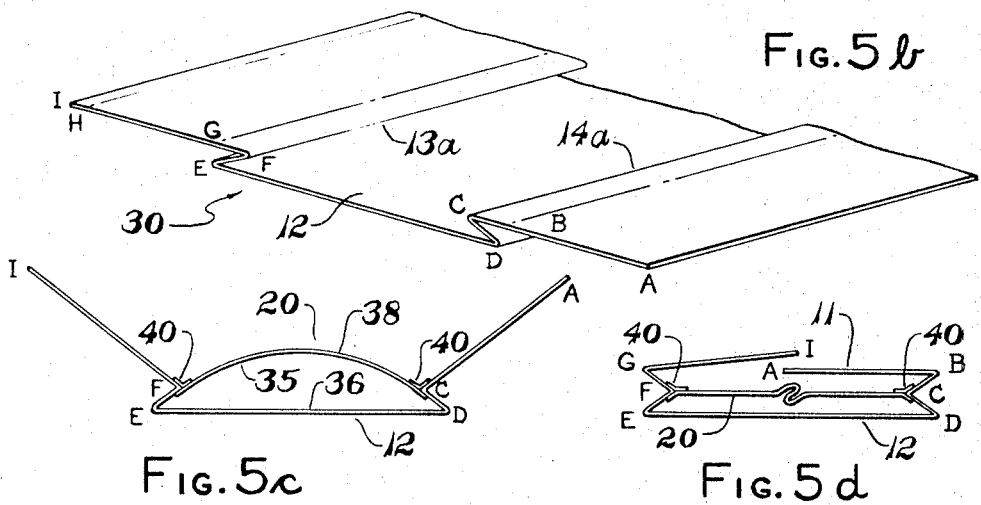
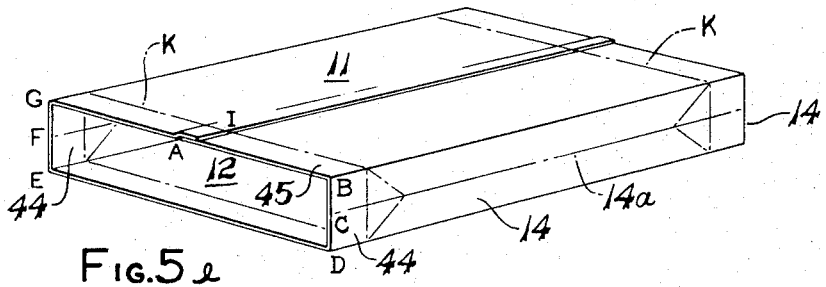
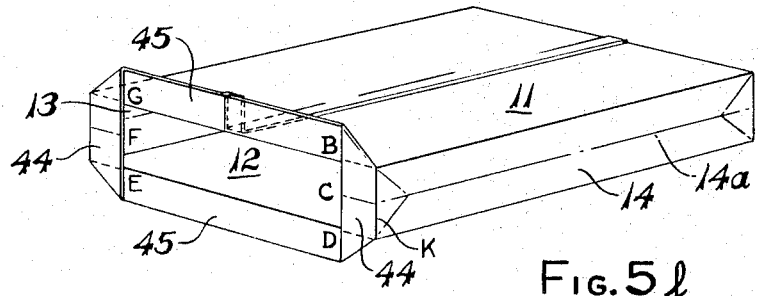
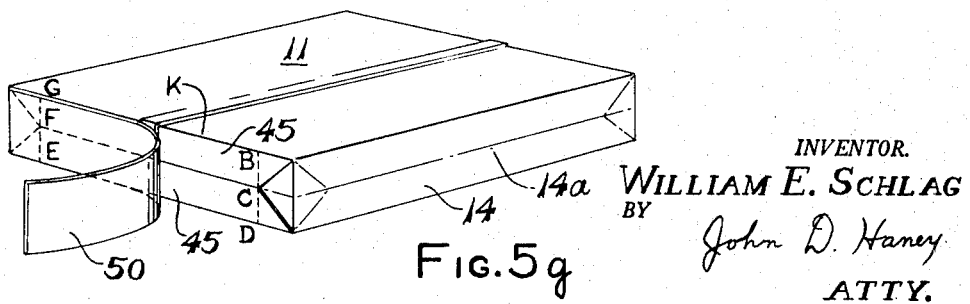
INVENTOR.
WILLIAM E. SCHLAG
BY
John D. Haney
ATTY.

United States Patent Office 3,367,819
Patented Feb. 6, 1968

3,367,819
METHOD OF MAKING INFLATABLE DUNNAGE BAG
William E. Schlag, Kent, Ohio, assignor to The B. F. Goodrich Company, New York, N.Y., a corporation of New York
Original application Dec. 22, 1961, Ser. No. 161,450. Divided and this application Oct. 21, 1963, Ser. No. 322,268
3 Claims. (Cl. 156—227)

This application is a division of application Ser. No. 161,450, filed Dec. 22, 1961 and now abandoned.

This invention relates to pneumatic dunnage bags for shoring cargo in a dunnage compartment. Ordinarily such bags are used for shoring stacks of cargo such as pasteboard cartons, bricks, ingots, barrels, etc. inside cargo compartments in railway cars and trucks. In using such bags, a cargo is ordinarily stacked against one wall of a dunnage compartment and then is pressed against such wall by inflating a dunnage bag in a gap between an opposing vertical face of the cargo stack and any adjoining rigid structure such as another wall of the compartment or another similar cargo stack. This invention more particularly relates to improvements in the construction of dunnage bags for this service and to a method especially suitable for making the improved bags.

The improved dunnage bags of this invention are designed to inflate against the cargo into a generally rectangular shape instead of a rounded pillow-like shape characteristic of the dunnage bags previously known in the art. The improved bags include two opposing cargo-engaging main panels which are approximately the same size as the face of the cargo presented to the bag, both before and after inflation of the bag against the cargo. The main rectangular panels of each bag are flexible fabric and are separated by marginal panels which are designed to fold inwardly into the space between the main panels when the bag is deflated. The bags further include means for restraining the marginal panels from bulging substantially beyond the margins of the main panels as the bag is inflated. On inflation the marginal panels unfold toward a straight or slightly arched shape while the main panels separate in generally parallel relation in the gap and remain generally parallel each other when in engagement with the cargo, within the range of separation permitted by the marginal panels.

Several significant operating advantages are provided by these rectangular bags over the generally pillow-shaped dunnage bags which have been used prior to this invention for this service. First, new rectangular bags are adapted to fill entirely the gap in which the bag is installed and to exert uniform pressure over the entire face of the cargo stack presented to the bag, thereby preventing local displacement of certain portions of the cargo stack such as those parts near the floor of the compartment, or along the upper tier of the stack. Second, these improved rectangular bags display no tendency to roll or squeeze out of the gap.

Prior to this invention pneumatic dunnage bags ordinarily have been made by directly joining together the corresponding margins of two flexible sheets of fabric. Such bags consequently assume on inflation a convex rounded or pillow like shape along their edges. Inherently, bags of this shape tend to exert a high localized pressure in the center of the cargo face and no appreciable pressure against the marginal regions of the cargo face. Accordingly, it is impossible for these pillow type bags to prevent local shifting and displacement of the articles of the cargo along the floor of the compartment, as well as those along the vertical sides, along the upper tier and in the corners of the cargo stack. Also with such pillow bags, the area of the cargo face engaged by the bag decreases with an increase in the width of the gap in which the bags are installed. These problems can not be solved in a particular installation merely by using a larger pillow type bag for the reason that there is ordinarily no space available at the bottom or the side of the cargo stack to accommodate the projecting edges of a larger pillow bag. Even though the space were available, however, the projecting edges of the bag most probably would be subjected to abrasion during transportation which would quickly wear holes in the bag and render it inoperative. These problems are eliminated by the new rectangular bags which fit against the entire face of the cargo stack and do not project materially beyond the edges (except possibly above the cargo stack). Also, within the range of separation permitted by the size of the marginal folding panels, the area of the cargo engaged by the main panels is independent of the width of the gap.

The improved dunnage bags of rectangular shape display no tendency to roll or work upward out of the gap between the cargo and the adjoining rigid structure in which the dunnage bag is installed. Apparently the generally curved shaped of the prior pillow-type dunnage bags tend to encourage rolling of the bag on the surface of the cargo face as a result of the vibration and other shock loads to which the cargo is subjected in transit.

A dunnage bag of this invention is preferably made by folding a single sheet of fabric to form the two parallel flexible cargo-engaging main panels and the interconnecting upper, lower and side marginal panels. The side marginal panels are preferably reinforced with additional fabric and an inflating valve is attached to one of the marginal panels. The internal margin-restraining means is installed during the folding procedure.

The invention will be further described with reference to the accompanying drawings which, by way of example, show one preferred method of making such bags:

Figure 3:
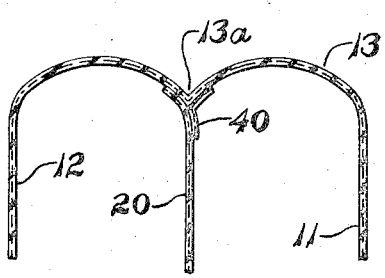
Figure 4:
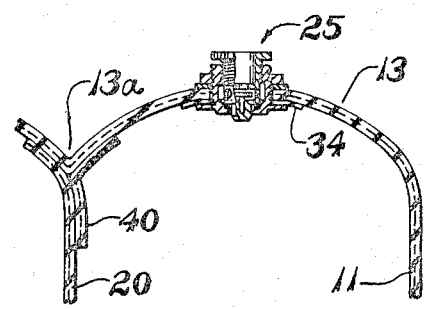
Figure 1:
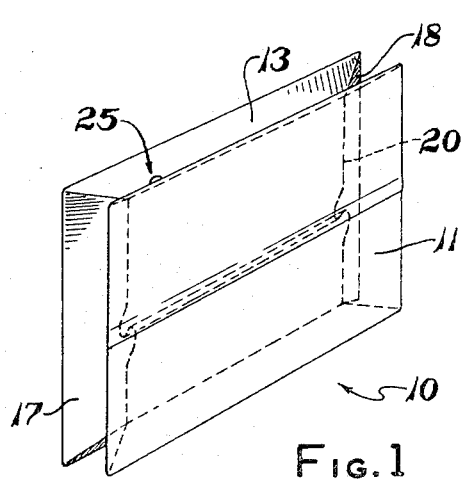
FIG. 1 is a view of a preferred form of the improved dunnage bag when deflated.
Figure 2:
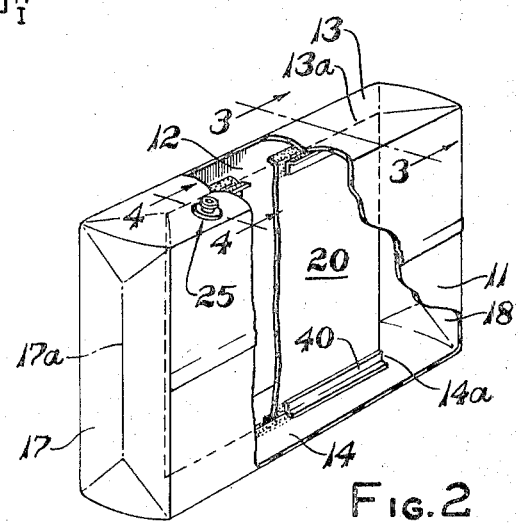
FIG. 2 is a perspective view of the dunnage bag of FIG. 1 after the bag is more fully inflated.

FIG. 3 and FIG. 4 are detail sectional views taken along the lines 3—3 and 4—4 respectively of FIG. 2; and FIGS. 5a–5g show successive steps in a preferred method of making a dunnage bag as shown in FIGS. 1 and 2.

A dunnage bag 10 as shown in FIGS. 1 and 2 has two parallel, opposing main cargo-engaging panels 11 and 12 of equal size and of rectangular shape. The panels 11 and 12 are a flexible air-impervious fabric.

At their upper and lower edges, respectively, the main panels 11 and 12 are interconnected by inwardly folding marginal panels 13 and 14. Similarly, the corresponding vertical side edges of panels 11 and 12 are interconnected by inwardly folding margin panels 17 and 18. The edges of all the folding panels are joined to the main panels to define an air tight container which inflates to approximately rectangular shape.

As best shown in the partially cut away view in FIG. 2, each marginal panel 13, 14, 17 and 18 has a folding line 13a, 14a, 17a and 18a, respectively, at substantially the mid plane between the cargo-engaging panels 11 and 12. The interior chamber of the dunnage bag defined by the foregoing panels is divided at this mid plane by a flexible fabric piece 20 which is rectangular and has its upper edge joined to upper panel 13 along folding line 13a and has its lower edge joined to lower panel 14 along folding line 14a. The length of the fabric piece 20 between folding line 13a and folding line 14a is equal to or slightly less than the vertical dimension of the main panels 11 and 12. Accordingly, when the dunnage bag is in its folded deflated condition (as in FIG. 1) fabric piece 20 will be in a loose slack condition inside the bag.

In the preferred construction illustrated, the fabric piece 20 is joined only to the upper and lower margin panels 13 and 14; the two vertical edges of fabric piece 20 are separate from marginal panels 17 and 18 so that the inflating medium can communicate with both sides of fabric piece 20 through the space between these vertical edges and panels 17 and 18. The vertical edges of the fabric piece 20 could be joined to the marginal panels 17 and 18 if desired, and if this is done, these edges should be joined at the folding line 17a and 18a in the same manner (hereinafter explained) as the connection of the upper and lower connection of fabric piece 20 to panels 13 and 14. In this latter event, the fabric piece 20 would be preferably provided with holes (not shown) or other suitable means for establishing communication of the inflating medium to the opposite sides of the fabric piece. Ordinarily it is not necessary to fasten the vertical edges of the fabric piece 20 for reasons which will subsequently appear.

The main function of the fabric piece 20 is to restrain the upper and lower marginal panels 13 and 14 from bulging appreciably beyond the edges of the main panels when the bag is inflated. If the fabric piece 20 is also connected to the side marginal panels 17 and 18 it will serve the same function with respect to them.

FIG. 2 depicts the approximate shape of the dunnage bag as it would be when inflated with its main panels 11 and 12 in engagement with a cargo stack and other opposing structure. Under these conditions the bag is approximately rectangular and the marginal panels 13 and 14 are only very slightly arched between their junctions with the edges of the main panels 11 and 12 and with the sheet 20. Marginal panels 17 and 18 are only slightly arched between panels 11 and 12.

The dunnage bag is equipped with a suitable inflating valve 25 fastened into the upper marginal panel 13. Any suitable inflating valve may be used having flanges for securing the valve body to the fabric panels.

Successive major steps in the preferred procedure for manufacturing the dunnage bags of this invention are illustrated in FIGS. 5a–5g.

Each dunnage bag is preferably made by folding a single flat sheet of rubber-covered fabric into the configuration described in the foregoing. Such a fabric sheet is indicated by number 30 in FIG. 5a. It is possible to splice several smaller sheets of fabric together to make up the single piece 30 of FIG. 5a although it is ordinarily much more convenient to work with a single unspliced sheet. Preferably, the fabric is a strong square-woven duck fabric which is impregnated and thoroughly coated on both sides with an appropriate rubber compound which has good abrasion resistance and also which is impermeable to air, the normal inflation medium. Compounds of butyl or neoprene rubbers are ordinarily suitable.

Figure 5A:
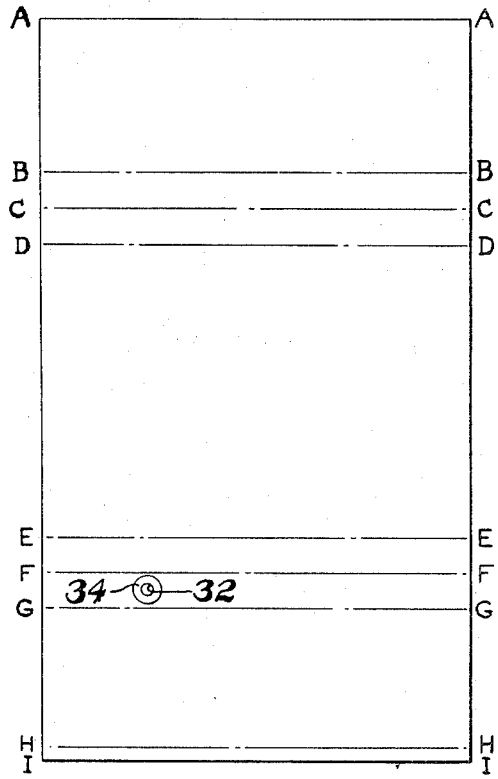

The first step in the building procedure is to mark on both sides of the flat fabric sheet 30 (by the use of templates or other means, not shown) the reference lines indicated by the capital letters B, C, D, E, F, G and H indicated in FIG. 5a. Also, a valve hole 32 is cut from the fabric. If templates are used in laying out these reference lines the edges of the templates will be suitable as guides for trimming the margins of sheet 30 to the exact size of the template.

Next, the side of the fabric sheet 30 which is to be the inside of the dunnage bag is selected. Ordinarily, if the coating of rubber on one side of the fabric is thicker than on the other, the side having the thicker coating is selected as the interior of the bag. Around the valve hole an annular fabric patch 34 is cemented, the size and type of this patch depending ultimately on the type of valve used.

As shown in FIG. 5b, the fabric sheet 30 is then folded along the line D and along the line E and then reversely folded along the line C and along the line F, the lines C and F corresponding to the folding lines 13a and 14a, respectively, as shown in FIG. 2. The next major step is to cement in place the margins of the internal fabric piece 20 as shown in FIG. 5c. The upper margin of the fabric piece 20 is cemented so that it overlaps the panel defined between the reference lines E and F, while its opposite or lower margin is cemented to overlap the panel defined between reference lines C and D. Prior to cementing these margins of the fabric piece 20 in place, the surface 35 of fabric piece 20 and the oppositing surface 36 of sheet 30 are coated with a suitable material to prevent these surfaces from adhering to each other when the bag is eventually cured. Various materials well known in the art may be used for this purpose such as powdered soapstone or metallic paint solutions containing aluminum or silver which adheres to the surface but which does not contaminate the rubber compound. At the junction of the opposite surface 38 of the fabric piece 20 with the panel portions defined between reference lines F and G and also reference lines C and D, a crotch tape 40 is cemented in place, the tape overlapping both the fabric piece 20 and these panels of sheet 30. It may be noted in FIG. 5c that the length of the fabric piece 20 is greater than the distance between reference lines F and C.

Following the placement of the fabric piece 20 and the assemblage of the crotch tapes 40, the upper surface 38 of the fabric piece 20 and the opposing inside surface of sheet 30, except that area between reference line H and edge I is coated with the anti-sticking material previously described. Then these latter portions of the fabric sheet 30 are folded on lines G and B so that edge A of the original fabric sheet underlies the uncoated panel portion between line H and edge I, as shown in FIG. 5d. This latter panel portion is cemented to the underlying surface adjoining edge A as shown in FIG. 5e.

These operations result in the formation of a rectangular open ended tubular structure as shown in FIG. 5e divided internally by the fabric piece 20, the latter being omitted from FIG. 5e to simplify the illustration. Next, each open end of this rectangular tubular structure is folded on reference lines K in a square fold as shown in FIG. 5f. More specifically, the marginal portions of the regions B–D and G–E are folded inwardly at each end as indicated by numeral 44 in FIG. 5f, whereas the marginal portions of regions G–B and E–D are folded upwardly at right angles as indicated at numeral 45 in FIG. 5f. Then portion 45 is folded downwardly and cemented to the overlapped portions 44 as in FIG. 5g to provide end closures for the bag. Next, as in FIG. 5g, an additional fabric sheet 50 is cemented over the regions 45. The opposing edges of the regions 45 fit together in abutting relation and hence coincide with the folding lines 18a and 17a in the finished bag. The valve 25 may be installed in the hole 32 at any convenient time in the construction, or it may be installed by buttonholing it through the hole 32 and fastening it tightly after the entire bag construction has been completed.

The extra fabric pieces 50 over regions 45, 45 form the side marginal panels 17, 18 of the finished bag. Because these panels consist of two fabric thicknesses, they are stiffer than the other panels of the dunnage bag, and therefore do not tend to arch appreciably when the bag is inflated. Accordingly, it is not essential to connect these marginal panels to the restraining fabric piece 20. If the bag is to be inflated to pressures higher than pressures of about 2 or 3 pounds per square inch gauge which it ordinarily used, it may be desirable to provide for restraining these panels 17 and 18 from outward bulging as by connecting them to the fabric piece 20.

After the entire assembly is completed, it may be inflated and vulcanized in open steam or it may be vulcanized in deflated condition in a flat press. The finishing technique will naturally vary with the nature of the fabric and elastomeric coating compounds used. If certain thermoplastic film materials are used, or if elastomeric coatings are used which do not require vulcanization or which require a finishing treatment other than the usual heat and pressure vulcanizing process, then, obviously, the latter vulcanizing step may be omitted. Finishing techniques appropriate to the materials from which the bags are made can be chosen by the exercise of routine skill in the art.

Bags made according to this invention may be inflated with pressures from as low as 0.25 pound per square inch gauge to as much as 12 pounds per square inch gauge depending on the character of the cargo. The bags may be appropriately reinforced to sustain even much higher pressures if desired.

Variations in the bag construction and in the method may be made within the scope of the appended claims.

I claim:

1. A method of making a dunnage bag comprising:
   (a) providing a fabric sheet of air impervious material;
   (b) folding said sheet along pre-arranged reference lines to form two opposed parallel main panels and two opposed marginal panels, the latter marginal panels being centrally creased so that the marginal panels are folded inwardly between the two main panels;
   (c) fastening a flexible member to each marginal panel at the crease therein so that the flexible member extends from one marginal panel to the other between said main panels and is adapted to restraint folding of the marginal panels appreciably beyond the periphery of said main panels;
   (d) joining together the opposing ends of said fabric sheet to form an open ended tube consisting of said main panels and said creased marginal panels;
   (e) folding opposing portions of each margin region of said open-ended tube inwardly toward each other to form two additional opposed marginal panels each with a central crease so that the latter marginal panels fold inwardly between said main panels and cooperate with said other panels to define an air tight enclosure of generally rectangular shape when inflated; and
   (f) installing an inflating valve in one of said marginal panels.

2. A method according to claim 1 which further comprises covering the creased region of the external surface of said marginal panels formed as in step (e) with an additional piece of fabric.

3. A method according to claim 1 which further comprises coating the internal adjoining surfaces of said fabric sheet with a composition to prevent such surfaces from adhering to each other, the coating step being performed prior to completing step (e).

References Cited
UNITED STATES PATENTS

| | | | |
|---|---|---|---|
| 2,273,732 | 2/1942 | Quisling | 156—227 X |
| 2,349,705 | 5/1944 | Clark | 156—227 X |
| 2,666,007 | 1/1954 | Hovey | 156—120 |
| 2,919,747 | 1/1960 | Post | 5—348 |

EARL M. BERGERT, *Primary Examiner.*

HAROLD ANSHER, *Examiner.*